(No Model.)
O. M. NEWMAN.
RICE HULLER.
No. 317,840. Patented May 12, 1885.
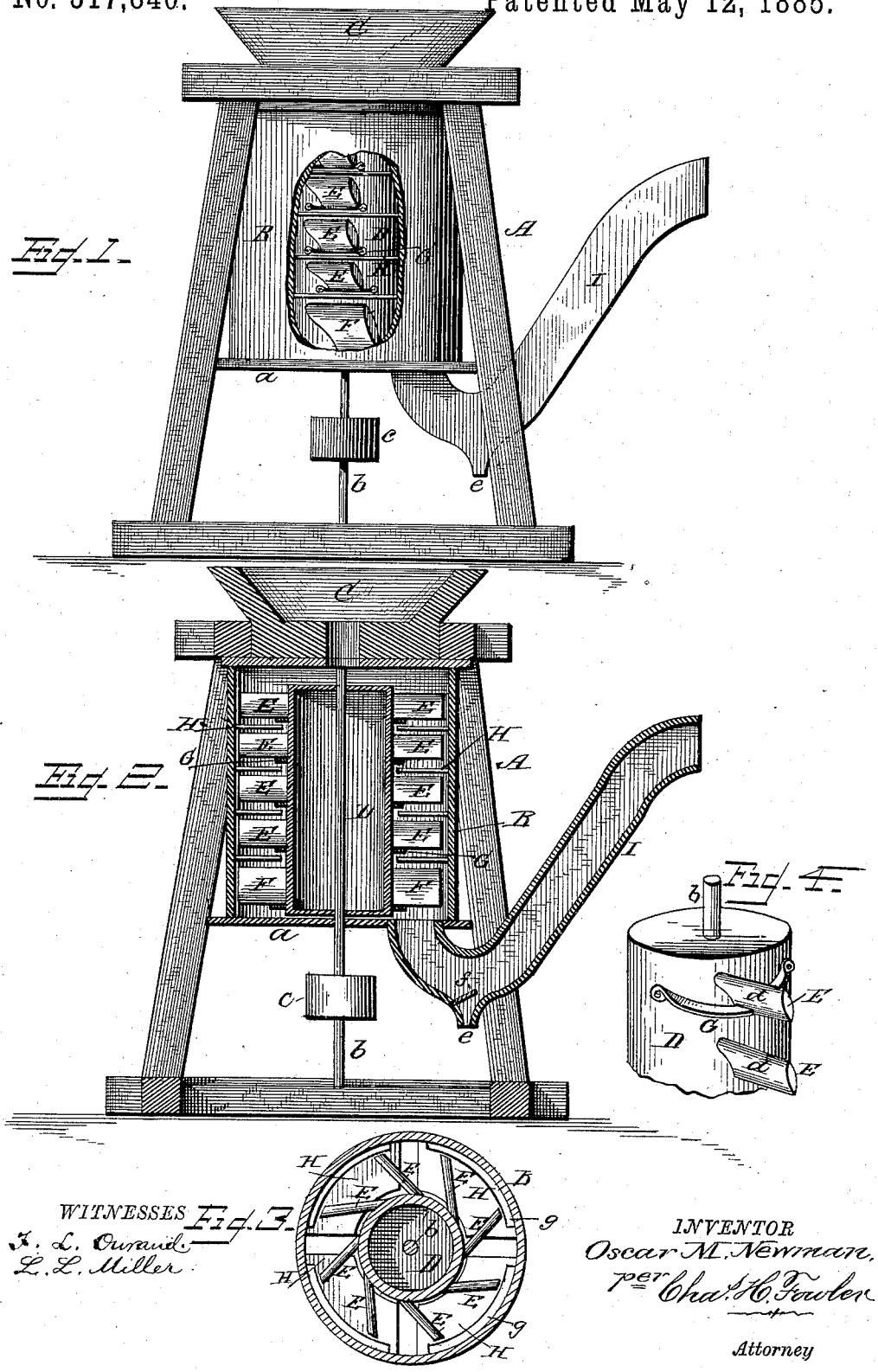
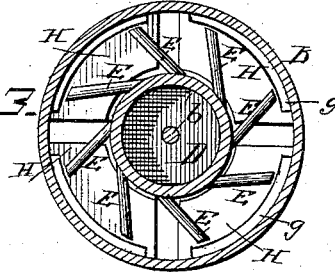
WITNESSES
J. L. Ourand
L. L. Miller
INVENTOR
Oscar M. Newman,
per Chas. H. Fowler
Attorney

UNITED STATES PATENT OFFICE.

OSCAR MANTAGE NEWMAN, OF MILTON, FLORIDA.

RICE-HULLER.

SPECIFICATION forming part of Letters Patent No. 317,840, dated May 12, 1885.

Application filed February 19, 1885. (No model.)

*To all whom it may concern:*

Be it known that I, OSCAR M. NEWMAN, a citizen of the United States, residing at Milton, in the county of Santa Rosa and State of Florida, have invented certain new and useful Improvements in Rice-Hullers; and I do hereby declare that the following is a full, clear, and exact description of the same, reference being had to the annexed drawings, making a part of this specification, and to the letters and figures of reference marked thereon.

Figure 1 of the drawings is a side view of my improved rice-huller with the cylinder partly broken away; Fig. 2, a sectional elevation thereof; Fig. 3, a horizontal cross-section through the cylinder, and Fig. 4 a detail view in perspective of the revolving barrel carrying the beaters.

The present invention has relation to certain new and useful improvements in machines for hulling rice, whereby the outer husk and thin cuticle which adhere to the grain are effectually removed and separated; and it consists in the details of construction substantially as shown in the drawings, and hereinafter described and claimed.

In the accompanying drawings, A represents a suitable frame provided with a platform, $a$, for supporting the cylinder B, which is supplied with rice through a suitable hopper, C.

Within the cylinder B is a barrel, D, having securely fastened thereto a vertical shaft, $b$, provided near its lower end with a belt-pulley, $c$, for imparting rotary motion to the barrel through suitable belt-gearing.

The barrel D may be formed hollow or solid, as found desirable, and is provided upon its periphery with a number of vertical rows of beaters, E, and below each row of beaters is a fan-blade, F, also secured to the barrel.

The beaters E are convex upon their sides, as shown at $d$, and instead of extending radially from the center of the barrel extend tangentially therefrom, which, together with the convexity of the beaters, renders them more effective upon the rice as they move in the line of a circle.

Below each of the beaters E, and connected to the barrel D, is an apron, G, which is curved, as shown in Fig. 4, so that when the falling rice strikes it it will conduct it clear of the space between the outer surface of the barrel and the edges of the horizontal plates H, and prevent it from dropping down between them without first being acted upon by the beater immediately above the apron.

As the barrel D is revolved, the fan-blades F cause a draft to blow the husks out through the spout I, the cleaned grain passing out through a discharge, $e$, into a receptacle placed under it to receive the grain.

The spout I is of goose-neck shape, and communicates with the interior of the cylinder B through the platform $a$, and the discharge $e$ is of conical form, and has an upwardly-inclined guard-plate, $f$, over the opening of the discharge to prevent the husks from escaping through it when blown into and through the spout, but admits of the clean grain falling through as it leaves the cylinder.

The segmental plates H are provided with suitable openings, $g$, for the rice to pass from one plate to the next below it after being acted upon by the beaters and thrown against the interior of the cylinder.

There may be any number of beaters and plates, as found most convenient for different-sized machines.

Having now fully described my invention, what I claim as new, and desire to secure by Letters Patent, is—

1. In a rice-hulling machine, an outer cylinder provided upon its interior with vertical rows of horizontal plates having discharge-openings, in combination with a revolving barrel disposed within said cylinder, and provided with vertical rows of beaters, aprons arranged under them, and a fan-blade at the bottom of each row of beaters, substantially as and for the purpose set forth.

2. A rice-hulling machine, comprising an outer cylinder provided with vertical rows of horizontal plates having discharge-openings, a spout provided with a discharge for the grain, and a guard-plate arranged over it, and a revolving cylinder provided with beaters, aprons, and fan-blades, constructed and arranged substantially as and for the purpose specified.

In testimony that I claim the above I have hereunto subscribed my name in the presence of two witnesses.

OSCAR MANTAGE NEWMAN.

Witnesses:
J. C. GAINER,
JOHN M. MCGEHEE.